(12) United States Patent
Zheng et al.

(10) Patent No.: US 11,162,622 B2
(45) Date of Patent: Nov. 2, 2021

(54) WEDGE ADAPTER SEAL

(71) Applicant: UNITED TECHNOLOGIES CORPORATION, Farmington, CT (US)

(72) Inventors: Rui He Zheng, Ansonia, CT (US); Paul E Strong, Bristol, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 616 days.

(21) Appl. No.: 15/965,518

(22) Filed: Apr. 27, 2018

(65) Prior Publication Data

US 2019/0331269 A1 Oct. 31, 2019

(51) Int. Cl.
| | |
|---|---|
| *F16L 23/032* | (2006.01) |
| *F16L 23/036* | (2006.01) |
| *F02C 7/22* | (2006.01) |
| *F16L 23/12* | (2006.01) |
| *F16L 23/16* | (2006.01) |

(52) U.S. Cl.
CPC ............ *F16L 23/036* (2013.01); *F02C 7/222* (2013.01); *F16L 23/12* (2013.01); *F16L 23/162* (2013.01); *F05D 2230/64* (2013.01)

(58) Field of Classification Search
CPC ..... F16L 23/0283; F16L 23/032; F16L 23/02; F16L 43/001; F16L 41/004; F16L 41/086
USPC ........................................................ 285/414
See application file for complete search history.

(56) References Cited

U.S. PATENT DOCUMENTS

| | | | | |
|---|---|---|---|---|
| 674,077 | A | * | 5/1901 | Coles .................... F16L 37/002 |
| | | | | 285/18 |
| 1,883,439 | A | * | 10/1932 | Adams .................. F16L 41/082 |
| | | | | 285/189 |
| 2,412,487 | A | * | 12/1946 | Amley .................. F16L 23/032 |
| | | | | 285/328 |

(Continued)

FOREIGN PATENT DOCUMENTS

| | | |
|---|---|---|
| CN | 201803015 | 4/2011 |
| DE | 20020014 | 7/2001 |

(Continued)

OTHER PUBLICATIONS

European Patent Office, European Search Report dated Aug. 28, 2019 in Application No. 19171269.4.

(Continued)

*Primary Examiner* — David Bochna
(74) *Attorney, Agent, or Firm* — Snell & Wilmer L.L.P.

(57) ABSTRACT

A wedge adapter seal may comprise a hard tube having a radially projecting flange and a wedge shaped body comprising a base flange and extending between a base flange face and a sealing face, wherein the hard tube is in fluid communication with the wedge shaped body with the radially projecting flange coupled proximate the sealing face. A wedge adapter seal may further comprise a ferrule coupled to the hard tube, wherein the ferrule comprises the radially projecting flange, a traveling flange disposed about the hard tube and configured to travel axially with respect to the hard tube, wherein the traveling flange comprises at least one of a triangular geometry having convex sides forming a Reuleaux triangle, a circular geometry, a rectangular geometry, a square geometry, or an oblique geometry.

15 Claims, 13 Drawing Sheets

(56) References Cited

U.S. PATENT DOCUMENTS

| | | | | |
|---|---|---|---|---|
| 2,568,414 | A | * | 9/1951 | Russ ................... F16L 23/125 |
| | | | | 285/55 |
| 4,484,771 | A | * | 11/1984 | Schulz ............... F16L 23/0283 |
| | | | | 285/368 |
| 5,018,546 | A | | 5/1991 | Carmack et al. |
| 6,050,614 | A | * | 4/2000 | Kirkpatrick .......... F16L 23/024 |
| | | | | 123/469 |
| 6,141,968 | A | * | 11/2000 | Gates ..................... F02C 7/222 |
| | | | | 239/423 |
| 9,897,008 | B2 | | 2/2018 | Meyers et al. |
| 9,915,171 | B2 | * | 3/2018 | Winn ..................... F01D 9/065 |
| 10,273,812 | B2 | * | 4/2019 | Huppe ................... F01D 5/187 |
| 2012/0104172 | A1 | * | 5/2012 | Haug ................... B29D 23/008 |
| | | | | 244/135 R |
| 2016/0208707 | A1 | * | 7/2016 | Meyers ..................... F02C 7/20 |
| 2017/0219134 | A1 | * | 8/2017 | Kedor ................ B22F 3/1055 |
| 2018/0187507 | A1 | * | 7/2018 | Hill ....................... E21B 33/068 |
| 2019/0292946 | A1 | * | 9/2019 | Karram ............... F16L 23/0286 |
| 2020/0240566 | A1 | * | 7/2020 | Lee ....................... F16L 43/008 |

FOREIGN PATENT DOCUMENTS

| | | | | |
|---|---|---|---|---|
| EP | 2808590 | | 12/2014 | |
| EP | 2957805 A1 | * | 12/2015 | ............. F16L 39/005 |
| WO | WO-2014113752 A1 | * | 7/2014 | ............. F01D 25/24 |
| WO | WO-2015076228 A1 | * | 5/2015 | ............. F16L 41/004 |

OTHER PUBLICATIONS

Espacenet, machine English translation of CN201803015 and DE20020014 retrieved Nov. 22, 2019.

European Patent Office, European Office Action dated Sep. 17, 2020 in Application No. 19171269.4.

* cited by examiner

WEDGE ADAPTER SEAL

FIELD

The disclosure relates generally to coupling interfaces between fluid transfer systems in gas turbine engines.

BACKGROUND

Gas turbine engines tend to have various external pumping systems and fluid transfer systems which may interface various turbine engine system components. Conduit assemblies may be used to flow any variety of fluids between two or more components. Some assemblies are at least, in part, flexible and others may be rigid. In various applications, rigid conduit assemblies may be preferred. One such application may be areas surrounding the immediate vicinity of a gas turbine engine case and within the gas turbine engine nacelle.

SUMMARY

In various embodiments the present disclosure provides a wedge adapter seal comprising a hard tube having a radially projecting flange, and a wedge shaped body comprising a base flange and extending between a base flange face and a sealing face, wherein the hard tube is in fluid communication with the wedge shaped body with the radially projecting flange coupled proximate the sealing face.

In various embodiments, the traveling flange comprises a ferrule coupled to the hard tube, wherein the ferrule comprises the radially projecting flange, a traveling flange disposed about the hard tube and configured to travel axially with respect to the hard tube, wherein the traveling flange comprises at least one of a triangular geometry having convex sides forming a Reuleaux triangle, a circular geometry, a rectangular geometry, a square geometry, or an oblique geometry. In various embodiments, at least one of a seal plate, coupled to one of the base flange or the sealing face, or an integral seal feature. In various embodiments, the wedge shaped body comprises a multi-lobed structure. In various embodiments, the multi-lobed structure comprises a three-lobed structure, wherein each lobe of the three-lobed structure is defined by multi radial curves forming at least one of an epitrochoidal or epicycloidal geometry. In various embodiments, the body further comprises a first bore through the sealing face and a second bore through the base flange face in fluid communication via a transition region. In various embodiments, the transition region comprises at least one of a chamfer, a radial surface, a multi radial surface, or a throttling device. In various embodiments, the sealing face defines a first plane and the base flange face defines a second plane, wherein the first plane and the second plane intersect at an angle θ between 5° and 75°. In various embodiments, the angle θ is defined by a clearance envelope describing an arc segment passing through the second plane and within a region described between the first plane and the second plane.

In various embodiments, the present disclosure provides a gas turbine engine comprising a compressor section configured to compress a gas, a combustor section aft of the compressor section and configured to combust the gas, a turbine section aft of the combustor section configured to extract work from the combusted gas, and a rigid conduit assembly in fluid communication between a first component and a second component, wherein the rigid conduit assembly comprises a wedge adapter seal coupled to the second component, the wedge adapter seal comprising a hard tube having a radially projecting flange, and a wedge shaped body comprising a base flange and extending between a base flange face and a sealing face, wherein the hard tube is in fluid communication with the body with the radially projecting flange coupled proximate the sealing face.

In various embodiments, the wedge adapter seal may further comprise a ferrule coupled to the hard tube, wherein the ferrule comprises the radially projecting flange, a traveling flange disposed about the hard tube and configured to travel axially with respect to the hard tube, wherein the traveling flange comprises at least one of a triangular geometry having convex sides forming a Reuleaux triangle, a circular geometry, a rectangular geometry, a square geometry, or an oblique geometry. In various embodiments, the wedge shaped body comprises a multi-lobed structure. In various embodiments, the multi-lobed structure comprises three-lobed structure, wherein each lobe of the three-lobed structure is defined by multi radial curves forming at least one of an epitrochoidal or epicycloidal geometry. In various embodiments, the body further comprises a first bore through the sealing face and a second bore through the base flange face in fluid communication via a transition region. In various embodiments, the transition region comprises at least one of a chamfer, a radial surface, a multi radial surface, or a throttling device. In various embodiments, the sealing face defines a first plane and the base flange face defines a second plane, wherein the first plane and the second plane intersect at an angle θ between 5° and 75°. In various embodiments, the angle θ is defined by a clearance envelope describing an arc segment passing through the second plane and within a region described between the first plane and the second plane. In various embodiments, a first seal plate is coupled between the radially projecting flange and the sealing face and a second seal plate is coupled between the base flange face and the second component.

In various embodiments, the present disclosure provides assembling and disassembling a wedge adapter seal comprising coupling a base flange of a wedge shaped body of a wedge adapter seal to a port of a component and coupling a radially projecting flange of a hard tube proximate a sealing face of the wedge shaped body, wherein the hard tube is in fluid communication with the port via the wedge shaped body, decoupling the radially projecting flange from the sealing face and decoupling the base flange from the port, and removing the wedge shaped body relatively away from the component along a vector described by an angle of the wedge shaped body. In various embodiments, the method further comprises inserting a hard tube through a traveling flange and coupling a ferrule having the radially projecting flange to the hard tube with the radially projecting flange at a distal end of the hard tube, contacting the traveling flange with the radially projecting flange and coupling the traveling flange to the wedge shaped body with the radially projecting flange therebetween such that the hard tube is in fluid communication with the port, and decoupling the traveling flange from the wedge shaped body, applying a backing force between the wedge shaped body and the traveling flange, and traversing the traveling flange axially along the hard tube away from the wedge shaped body.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
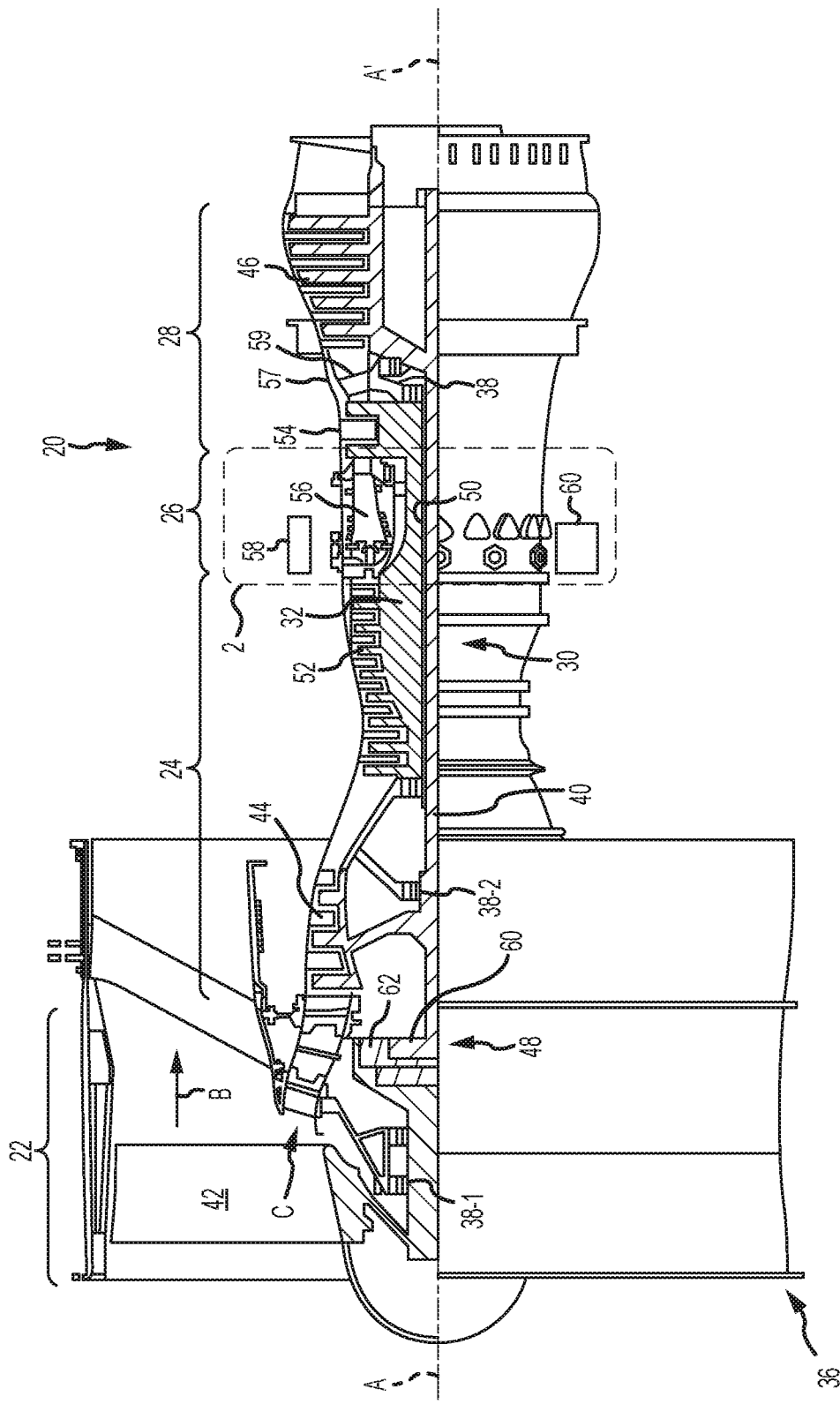
FIG. 1 illustrates a schematic cross-section of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Figure 2:
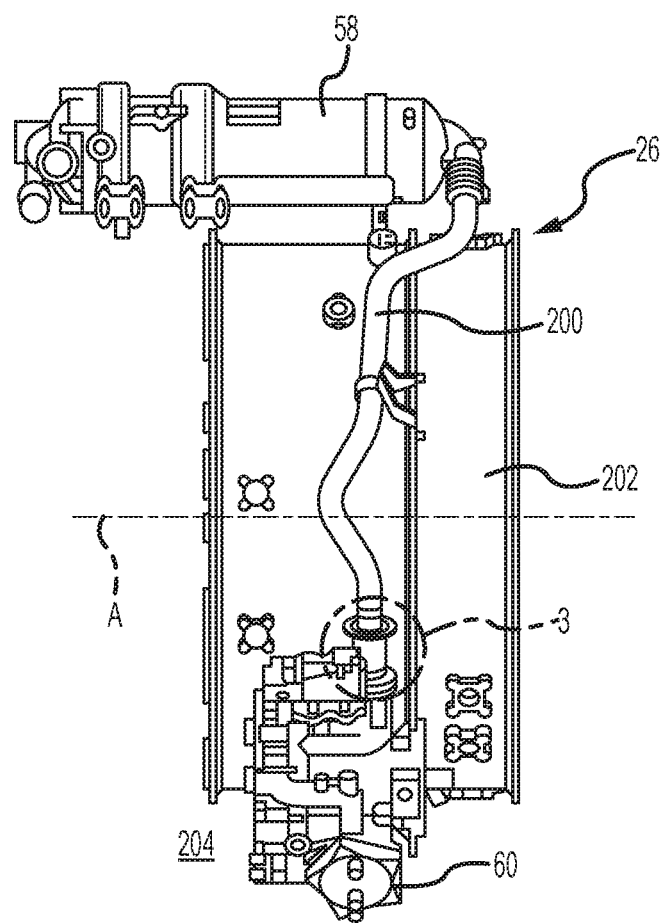
FIG. 2 illustrates a perspective view of a conduit assembly in one non-limiting example interconnecting a fuel-oil cooler with a fuel pump of the engine taken from circle 2 of FIG. 1, in accordance with various embodiments.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 62 enclosed within a gear housing. Gear assembly 62 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support.

In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with reference to FIGS. 1 and 2, combustor section 26 may further comprise an engine case 202 about the combustor section. A generally rigid conduit assembly 200 may be in fluid communication with and extends between a first component, such as a fuel-oil cooler 58, and a second component, such as a fuel pump 60. The cooler 58 and the fuel pump 60 may be detachably engaged to and supported by the engine case 202 proximate to the combustor section 26. The conduit assembly 200, cooler 58, and fuel pump 60 may be located within a generally annular cavity 204 having boundaries generally defined by the engine case 202 and an outer nacelle casing. In many applications, packaging of auxiliary equipment that support operation of the engine 20 creates cramped conditions within the cavity 204, thereby making assembly and maintenance operations within the cavity 204 difficult. It is further contemplated and understood that the conduit assembly 200 may be applied to any application and is not limited to gas turbine engines. Moreover, the cooler 58 and fuel pump 60 is only one, non-limiting, example, and may be any component where removal of the component(s) with interconnecting, rigid, conduits (and/or installation of rigid conduits to the components) may be particularly difficult due to surrounding conditions and packaging. For example, a component may be associated with the geared architecture 48 and the conduit assembly 200 may facilitate the delivery of oil or air as opposed to fuel.

Figure 3A:
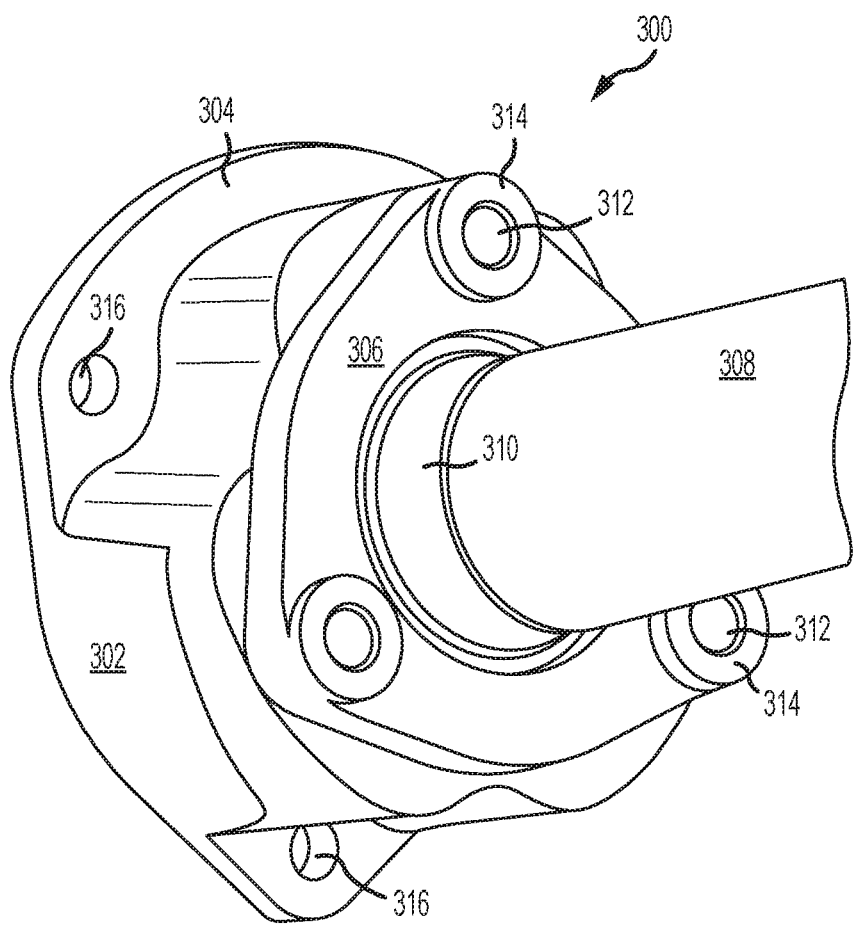
FIG. 3A illustrates a perspective view of a wedge adapter seal taken from circle 3 of FIG. 2, in accordance with various embodiments.
Figure 3B:
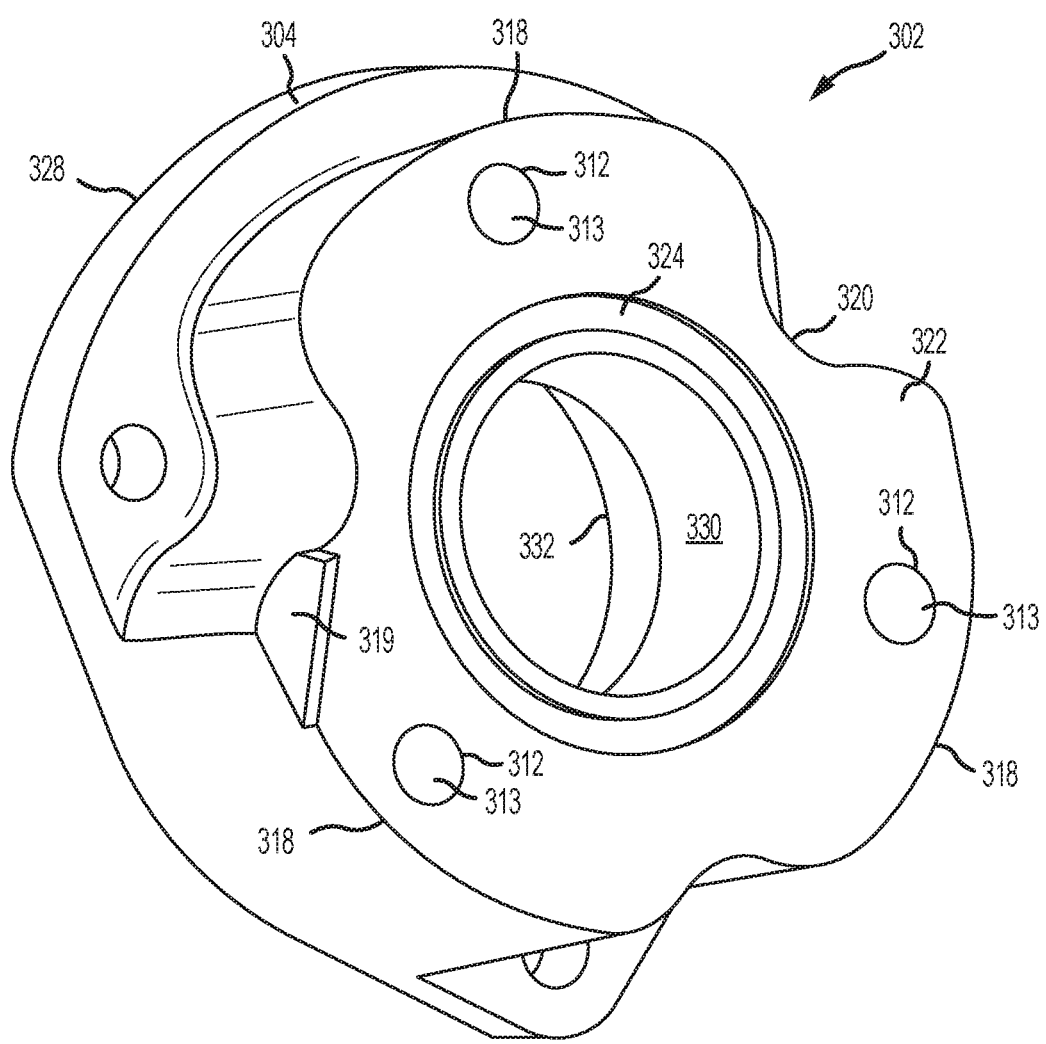
FIG. 3B illustrates a body of a wedge adaptor seal, in accordance with various embodiments.
Figure 3C:
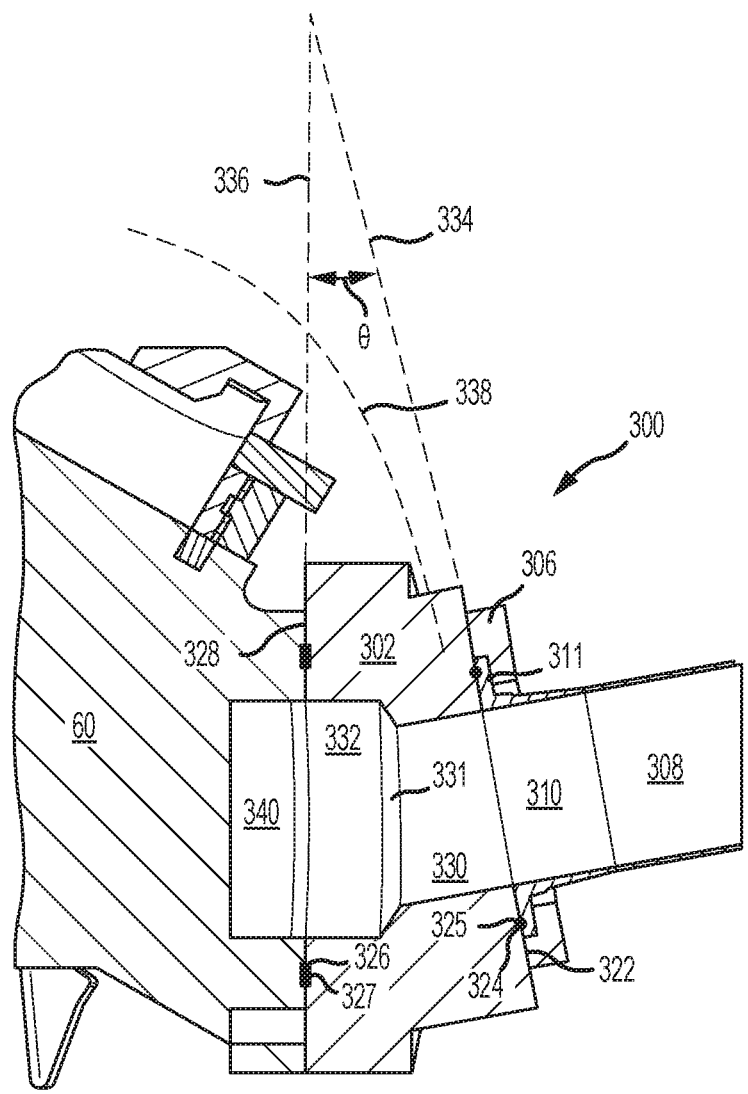
FIG. 3C illustrates a cross sectional view of a wedge adapter seal, in accordance with various embodiments.

With additional reference to FIGS. 3A thru 3C, conduit assembly 200 may comprise a wedge adapter seal 300. In various embodiments, wedge adapter seal 300 comprises a wedge shaped body 302 having a base flange 304, a hard tube 308, and a ferrule 310 coupled to hard tube 308. In various embodiments, ferrule 310 may comprise a radially projecting flange 311 at a distal end from hard tube 308 which may be coupled to a sealing face of wedge shaped body 302. In various embodiments, a traveling flange 306 may be disposed about hard tube 308. In various embodiments, hard tube 308 may have a diameter greater than 0.375 in. [9.53 mm]. In various embodiments, traveling flange 306 may comprise a triangular geometry having convex sides and, in that regard, may be a Reuleaux triangle or substantially similar to a Reuleaux triangle. In various embodiments, a traveling flange may comprise one of a circular geometry, a square geometry, a rectangular geometry, or may have an oblique geometry. In various embodiments, a first set of fastener holes 312 extend through each vertex of traveling flange 306 into wedge shaped body 302. In various embodiments, cylindrical extrusions 314 may extend about each of the first set of fastener holes 312 at each vertex of traveling flange 306.

In various embodiments and as shown with reference again to FIG. 3B, wedge shaped body 302 of wedge adapter seal 300 is shown in detail. In various embodiments, wedge shaped body 302 extends from sealing face 322 toward base flange face 328 of base flange 304 and may comprise a multi-lobed structure. In various embodiments, wedge shaped body 302 may have a three-lobed structure comprising lobes 318 defined by multi radial curves 320. In that regard, the three-lobed structure of wedge shaped body 302 may be substantially similar to at least one of an epitrochoid or epicycloid. In various embodiments, the first set of fastener holes 312 extend through sealing face 322 into wedge shaped body 302 at each of the lobes 318 and may comprise a threaded coupling 313 such as, for example, threads cut into wedge shaped body 302 or a threaded insert set into wedge shaped body 302 at each of the first set of fastener holes 312. In various embodiments, a second set of fastener holes 316 may be disposed through base flange 304 proximate a relatively inward curving portion of multi radial curves 320 defined between lobes 318. A first bore 330 extends from sealing face 322 into wedge shaped body 302 and opens via transition region 331 into a second bore 332 through wedge shaped body 302 extending through base flange face 328. In various embodiments, a first gland 324 may be formed in sealing face 322 and may be configured to retain a sealing element such as, for example, an O-ring 325. In various embodiments, first gland 324 may be disposed circumferentially about first bore 330 and may have a circumference defined by a circumference of radially projecting flange 311. In this regard, first gland 324 may tend to maintain O-ring 325 in contact with radially projecting flange 311 of ferrule 310 when traveling flange 306 is coupled in contact with sealing face 322. In various embodiments, tooling feature 319 comprises a portion of lobes 318 recessed from sealing face 322 tending thereby to permit entry of a tool between sealing face 322 and traveling flange 306 and at a perimeter of lobes 318. In this regard, tooling feature 319 may permit, via a tool, induction of a backing force between traveling flange 306 and wedge shaped body 302 tending to drive traveling flange 306 relatively away from wedge shaped body 302. In various embodiments, the tool may comprise a flat or blade such and an end of a shaft such as, for example, a prybar or a flathead screw driver. In various embodiments, the tool may be rotated about a long axis upon insertion into tooling feature 319 or may be pivoted upon insertion into the tooling feature 319 tending to drive the tool against tooling feature 319 and against traveling flange 306 thereby tending to generate the backing force.

In various embodiments and as shown with reference again to FIG. 3C, wedge adapter seal 300 is shown in planar cross-section of the y-z plane normal to base flange face 328. In various embodiments, first bore 330 and second bore 332 are joined by a transition region 331. In various embodiments, transition region 331 may comprise a chamfer, or may comprise a radial surface or multi-radial surface tending to reduce boundary layer turbulence between the first bore and the second bore. In various embodiments, transition region 331 may comprise a throttling device such as, for example, an orifice plate. In various embodiments, a second gland 326 may be formed in base flange face 328 and may be configured to retain a sealing element such as, for example, a seal 327. In various embodiments, second gland 326 may be disposed circumferentially about second bore 332 and may be configured to maintain seal 327 about port 340 when base flange face 328 is coupled in contact with fuel pump 60. In this regard, coupling wedge adapter seal 300 to a component, such as fuel pump 60, tends to allow fluid communication between hard tube 308 and port 340 through ferrule 310 and via first bore 330, transition region 331, and second bore 332 of wedge shaped body 302. In various embodiments, a first plane 334 defined by sealing face 322 may intersect a second plane 336 defined by base flange face 328 at an angle θ. In various embodiments, angle θ may be between 5° and 75°, or may be between 5° and 35°, or may be between 5° and 20°. In various embodiments, angle θ may be defined by a clearance envelope 338 about a component, such as fuel pump 60, describing an arc segment passing through the second plane 336 and within a region described between the first plane 334 and the second plane 336. In various embodiments, a wedge shaped body of a wedge adapter seal may be decoupled and removed from a port of a component by translating the wedge shaped body along a special vector comprising a y-component radiating relatively away from angle θ (along the negative y-axis) and, thereby, may tend to reduce scratching and/or binding between a sealing surface and a ferrule or a hard tube. In this regard, the angle θ of a wedge shaped body may tend to allow a component to be rotated within a clearance envelope relatively toward a hard tube. In various embodiments, a wedge shaped body such as wedge shaped body 302 may comprise at least one of a metal, a metal alloy, an aluminum alloy, a steel, a stainless steel, a nickel steel, a titanium, a or titanium alloy. In various embodiments, a traveling flange such as traveling flange 306 may comprise at least one of a metal, a metal alloy, an aluminum alloy, a steel, a stainless steel, a nickel steel, a titanium, a or titanium alloy.

Figure 4A:
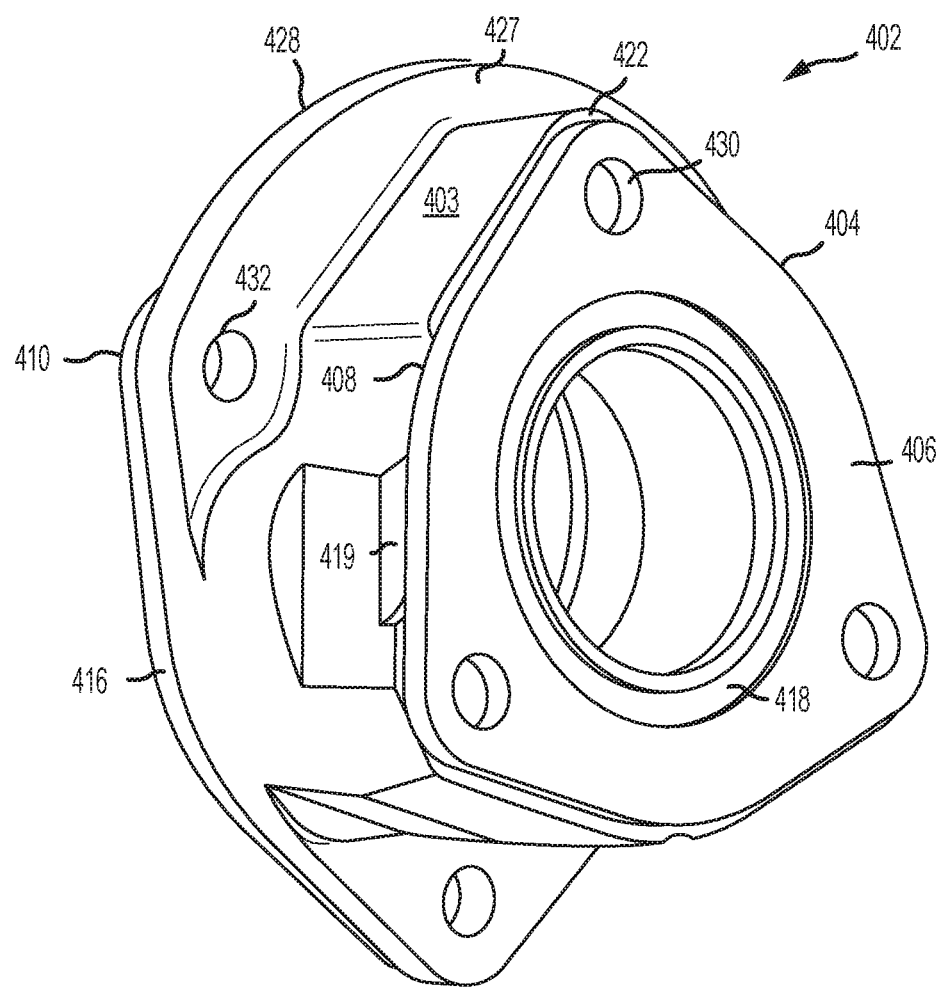
FIG. 4A illustrates a perspective view of a body of a wedge adaptor seal, in accordance with various embodiments.
Figure 4B:
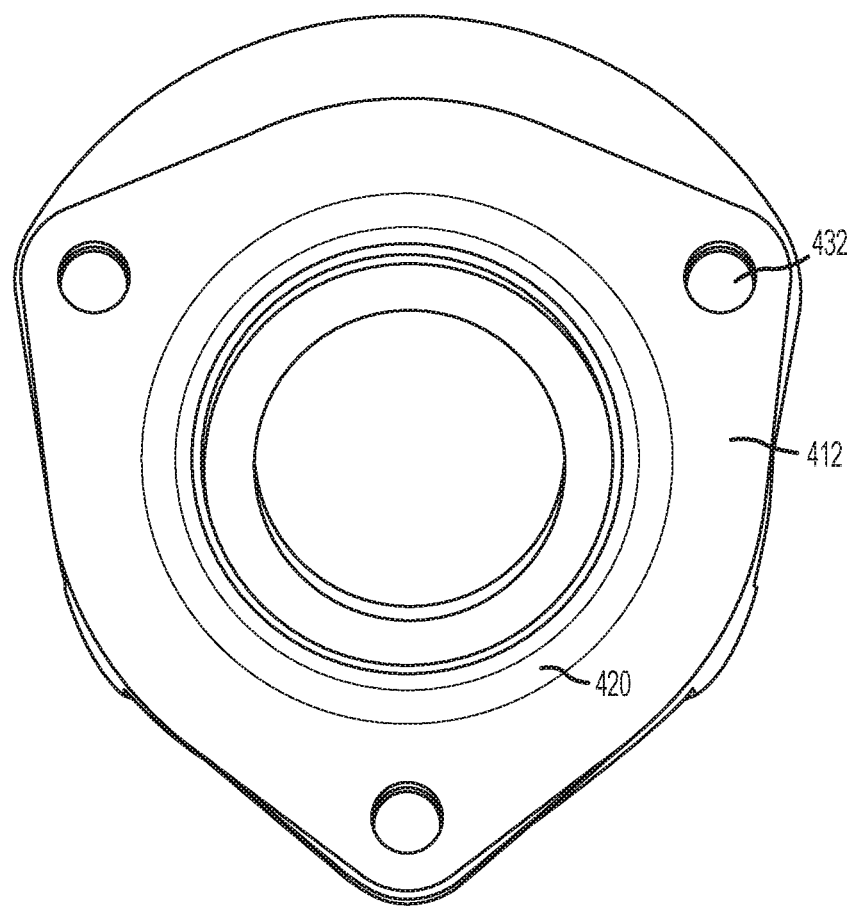
FIG. 4B illustrates a body of a wedge adaptor seal viewed toward a base flange face, in accordance with various embodiments.

In various embodiments and with additional reference to FIGS. 4A and 4B, wedge adapter seal 300 may comprise a wedge shaped body 402 having features, geometries, construction, materials, manufacturing techniques, and/or internal components similar to wedge shaped body 302. Wedge shaped body 402 comprises a first seal plate 404 having a first outer face 406 and a second seal plate 410 having a second outer face 412. In various embodiments, material 403 of wedge shaped body 402 extends from sealing face 422 toward base flange face 428 of base flange 427 and may comprise a triangular geometry, similar to traveling flange 306, having convex sides and, in that regard, may be substantially similar to a Reuleaux triangle. In various embodiments, first seal plate 404 comprises a first sealing element 418 at the first outer face 406 and second seal plate 410 comprises a second sealing element 420 at the second outer face 412. In various embodiments, the first seal plate 404 is integral to sealing face 422 and second seal plate 410 is integral to base flange face 428. In various embodiments, first seal plate 404 comprises a first inner face 408 comprising a third sealing element and second seal plate 410 comprises a second inner face 416 comprising a fourth sealing element. In various embodiments, first seal plate 404 may be coupled via coupling features 432 with first inner face 408 and the third sealing element in contact with sealing face 422. In various embodiments, second seal plate 410 may be coupled via coupling features 430 with second inner face 416 and fourth sealing element in contact with base flange face 428. In various embodiments, a sealing element such as, for example, first sealing element 418 or the third sealing element, may comprise one of an integral seal such as, for example, a Parker Stratoflex Gask-O-Seal®, a captured O-ring, a gland, or other such sealing element as known to those skilled in the art. In various embodiments, wedge shaped body 402 may comprise a tooling feature 419. In various embodiments, tooling feature 419 comprises a portion of material 403 recessed from sealing face 422 tending thereby to permit entry of a tool between sealing face 422 and first seal plate 404. In this regard, tooling feature 419 may permit, via a tool, induction of a backing force between first seal plate 404 and material 403 tending to drive first seal plate 404 relatively away from material 403. In various embodiments, coupling first seal plate 404 between wedge shaped body 402 and traveling flange 306 and coupling second seal plate 410 between base flange 427 and a port of a component such as port 340 of fuel pump 60 tends to establish fluid communication between the port and hard tube 308.

Figure 5:
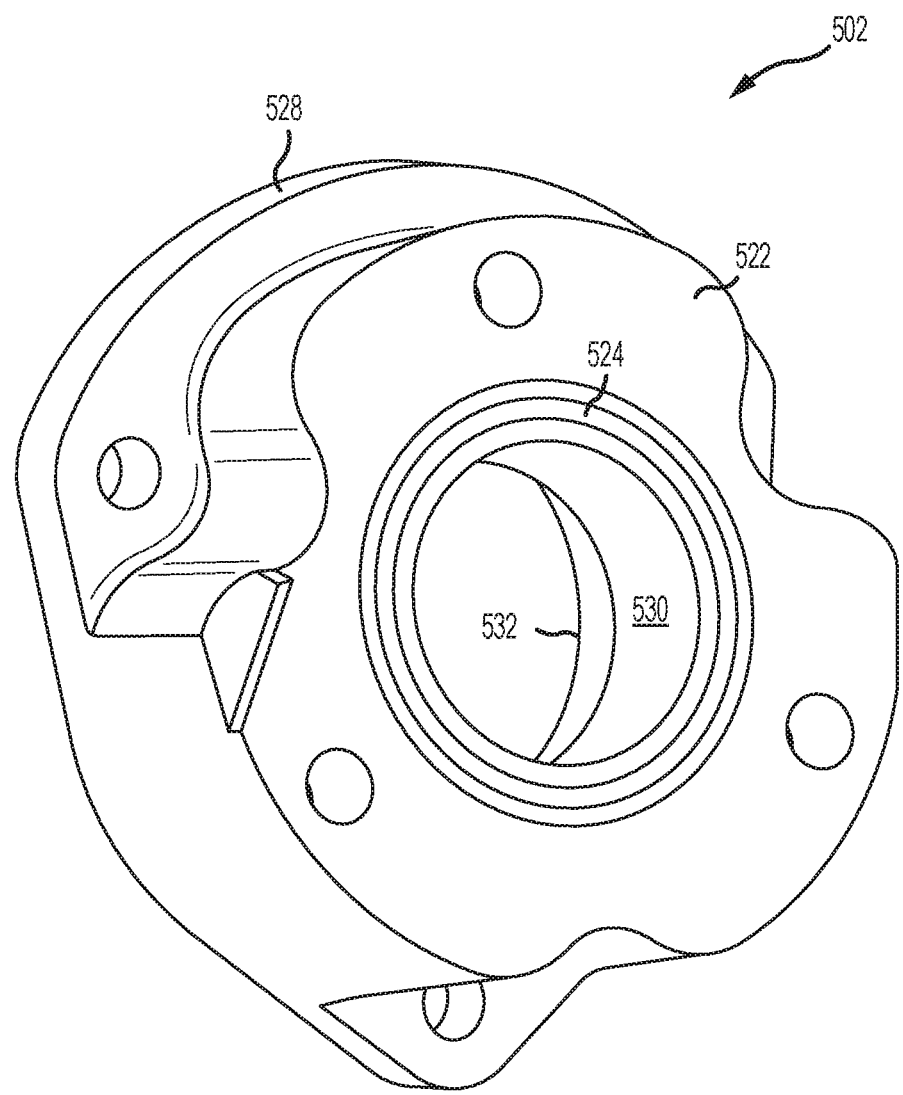
FIG. 5 illustrates a perspective view of a body of a wedge adaptor seal, in accordance with various embodiments.
Figure 6A:
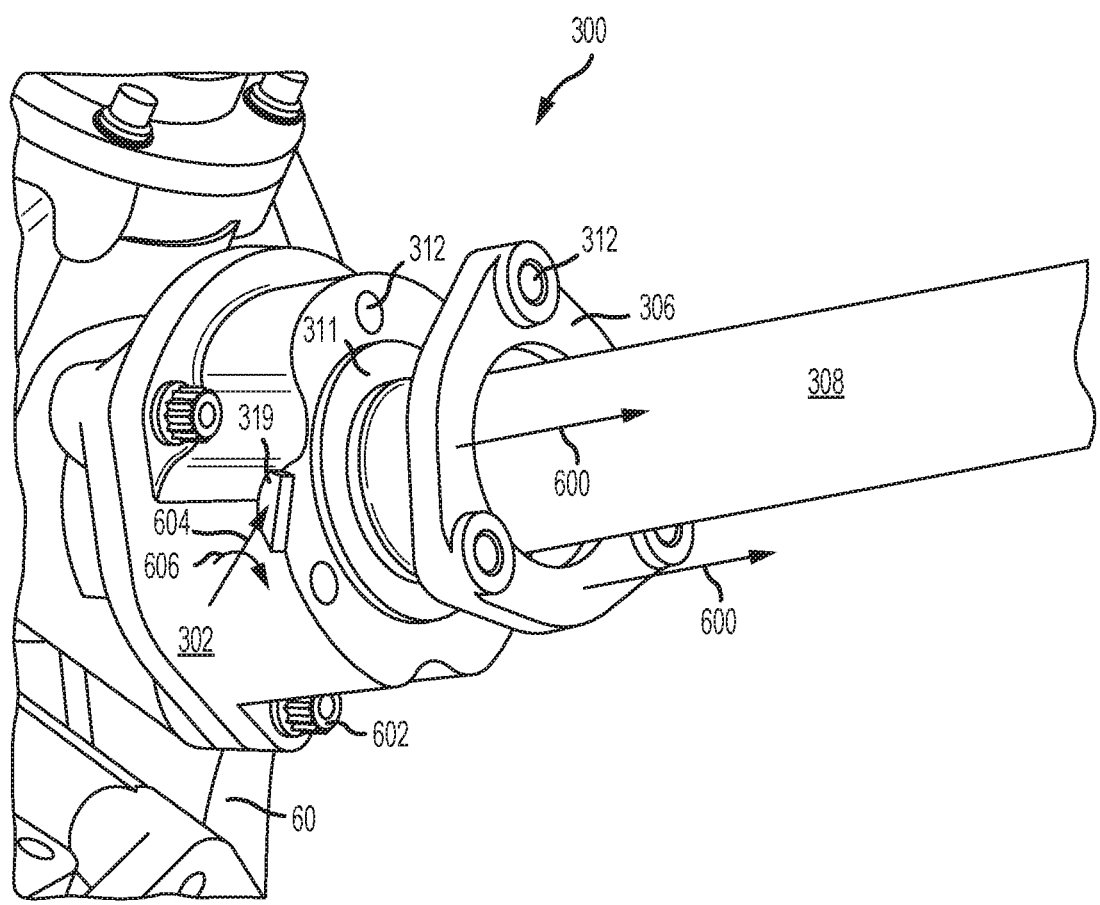
FIG. 6A illustrates a wedge adaptor seal having a decoupled traveling flange, in accordance with various embodiments.
Figure 6B:
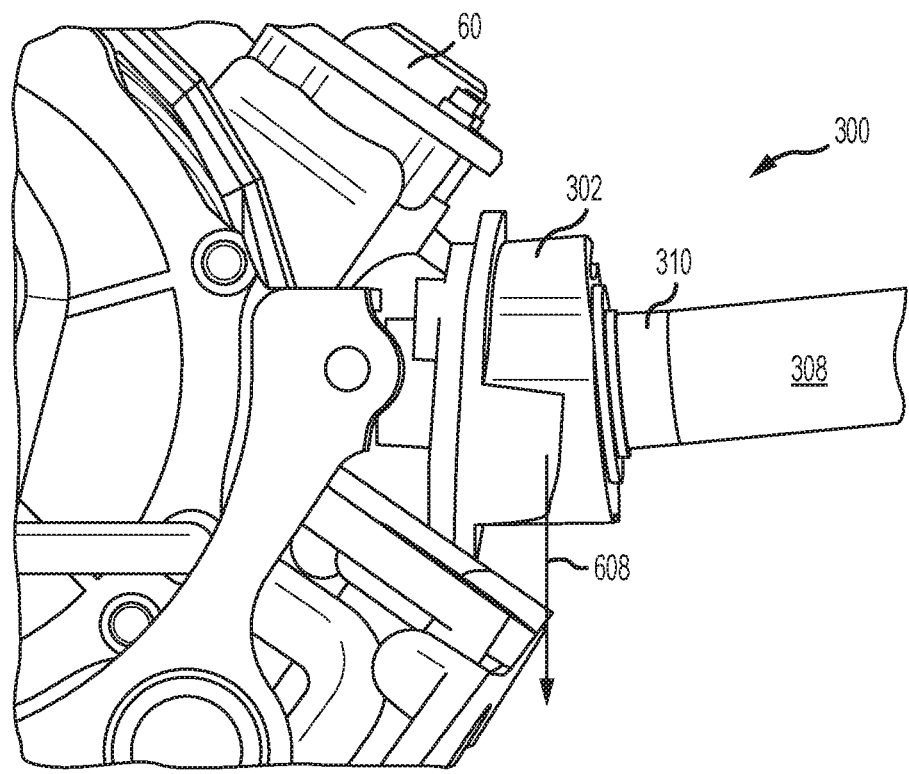
FIG. 6B illustrates a wedge adaptor seal with a decoupled body and traveling flange traversed away from the body, in accordance with various embodiments.
Figure 6C:
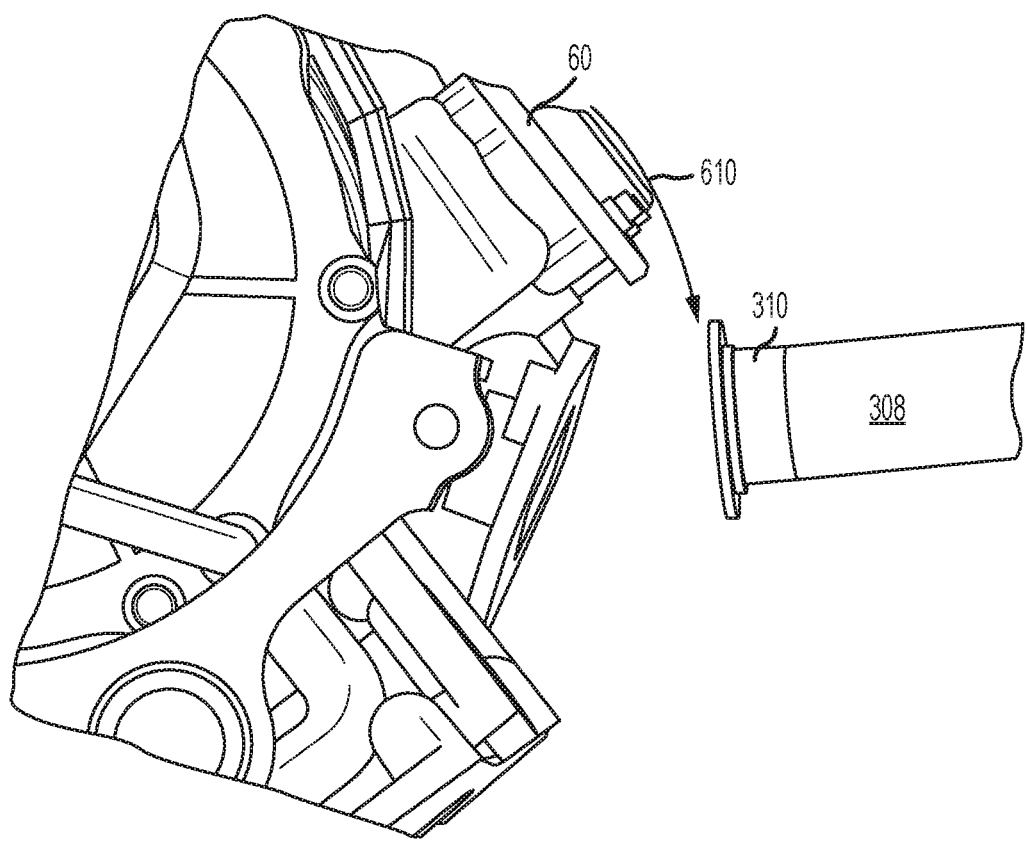
FIG. 6C illustrates a wedge adaptor seal with a removed body, in accordance with various embodiments.

In various embodiments and with additional reference to FIG. 5, wedge adapter seal 300 may comprise a wedge shaped body 502 having features, geometries, construction, materials, manufacturing techniques, and/or internal components similar to wedge shaped body 302. In various embodiments, wedge shaped body 502 may comprise a first integral seal 524 set circumferentially about first bore 530 into sealing face 522. In like regard, wedge shaped body 502 may comprise a second integral seal set circumferentially about second bore 532 into base flange face 528.

Figure 7:
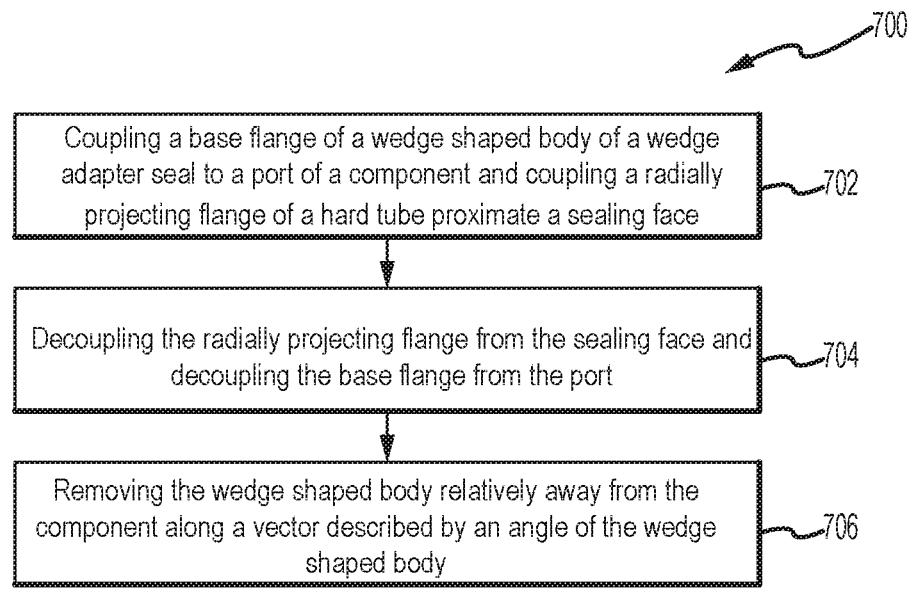
FIG. 7 illustrates a method of assembling and disassembling a wedge adapter seal, in accordance with various embodiments.
Figure 8:
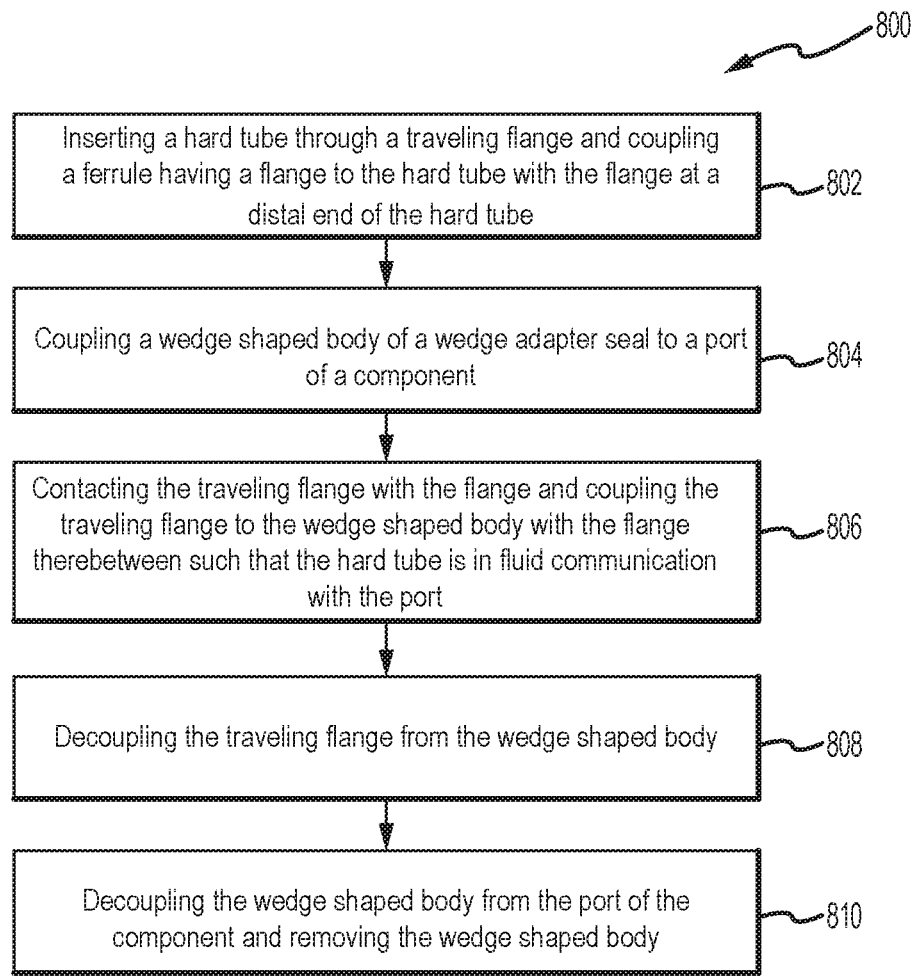
FIG. 8 illustrates a method of assembling and disassembling a wedge adapter seal, in accordance with various embodiments.

During assembly, disassembly and/or engine maintenance operations, the wedge adapter seal 300 facilitates both axial and rotational manipulation of hard tube 308 and components such as, for example, fuel pump 60 (without the use of more traditional braided flex tubing) for ease of installation under what may be close proximity to other hardware in confined spaces. In various embodiments and with additional reference FIG. 7, a method 700 of assembling and disassembling a wedge adapter seal is illustrated in accordance with various embodiments. Method 700 may comprise coupling a base flange of a wedge shaped body of a wedge adapter seal to a port of a component and coupling a radially projecting flange of a hard tube proximate a sealing face of the wedge shaped body (step 702), wherein the hard tube is in fluid communication with the port via the wedge shaped body. Method 700 may include decoupling the radially projecting flange from the sealing face and decoupling the base flange from the port (step 704). Method 700 may include removing the wedge shaped body relatively away from the component along a vector described by an angle of the wedge shaped body (step 706).

With additional reference to FIGS. 6A, 6B, 6C, and 8 a method 800 of assembling and disassembling a wedge adapter seal may comprise inserting hard tube 308 through traveling flange 306 and coupling ferrule 310 to hard tube 308 with radially projecting flange 311 at a distal end of hard tube 308 (step 802). In this regard, traveling flange 306 tends to be retained axially about hard tube 308 by radially projecting flange 311. In various embodiments, method 800 further comprises coupling a wedge shaped body of a wedge adapter seal to a port of a component (step 804) such as, for example, coupling wedge shaped body 302 to port 340 of fuel pump 60 with fasteners 602. In various embodiments, method 700 further comprises contacting the traveling flange 306 with the radially projecting flange 311 and coupling the traveling flange 306 to the wedge shaped body 302 with the radially projecting flange 311 therebetween such that hard tube 308 is in fluid communication with port 340 (step 706). In various embodiments, coupling traveling flange 306 to wedge shaped body 302 may comprise inserting fasteners through fastener holes 312. In various embodiments, method 700 may further comprise decoupling traveling flange 306 from wedge shaped body 302 (step 708). In various embodiments, step 708 may further comprise removing fasteners from fastener holes 312, inserting a tool (such as, for example, a pry bar or a flathead screw driver) at tooling feature 319 as indicated by arrow 604 and, via the tool, applying a backing force 606 between wedge shaped body 302 and traveling flange 306. In this regard, traveling flange 306 may be traversed axially along hard tube 308 relatively away from radially projecting flange 311 as indicated by arrows 600. In various embodiments, method 700 may further comprise decoupling and removing a wedge shaped body from a port of a component (step 710). In various embodiments, step 710 may comprise removing fasteners 602 from fastener holes 316 and remove wedge shaped body 302 relatively away from fuel pump 60 as indicated by arrow 608. In this regard, a component such as fuel pump 60 may be rotated or translated (as indicated by arrow 610) within a clearance envelope without contacting or interfering with hard tube 308.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for fluid communication comprising:
a rigid conduit assembly in fluid communication between a first component and a second component, wherein the rigid conduit assembly comprises a wedge adapter seal coupled to the second component, the wedge adapter seal comprising:
a hard tube having a radially projecting flange; and
a wedge shaped body comprising a base flange and extending between a base flange face and a sealing face, wherein the wedge shaped body comprises a multi-lobed structure, wherein the hard tube is in fluid communication with the wedge shaped body with the radially projecting flange coupled proximate the sealing face,
wherein the sealing face defines a first plane and the base flange face defines a second plane, wherein the first plane and the second plane intersect at an angle θ between 5° and 75°.

2. The system of claim 1, further comprising a ferrule coupled to the hard tube, wherein the ferrule comprises the radially projecting flange, a traveling flange disposed about the hard tube and configured to travel axially with respect to the hard tube, wherein the traveling flange comprises at least one of a triangular geometry having convex sides forming a Reuleaux triangle, a circular geometry, a rectangular geometry, a square geometry, or an oblique geometry.

3. The system of claim 1, further comprising at least one of a seal plate, coupled to one of the base flange or the sealing face, or an integral seal feature.

4. The system of claim 1, wherein the multi-lobed structure comprises a three-lobed structure, wherein each lobe of the three-lobed structure is defined by multi radial curves forming at least one of an epitrochoidal or epicycloidal geometry.

5. The system of claim 1, wherein the wedge shaped body further comprises a first bore through the sealing face and a second bore through the base flange face in fluid communication via a transition region.

6. The system of claim 5, wherein the transition region comprises at least one of a chamfer, a radial surface, a multi radial surface, or a throttling device.

7. The system of claim 1, wherein the angle θ is defined by a clearance envelope describing an arc segment passing through the second plane and within a region described between the first plane and the second plane.

8. A gas turbine engine comprising:
a compressor section configured to compress a gas;
a combustor section aft of the compressor section and configured to combust the gas;
a turbine section aft of the combustor section configured to extract work from the combusted gas; and
a rigid conduit assembly in fluid communication between a first component and a second component, wherein the rigid conduit assembly comprises a wedge adapter seal coupled to the second component, the wedge adapter seal comprising:
a hard tube having a radially projecting flange;
a ferrule coupled to the hard tube, wherein the ferrule comprises the radially projecting flange;
a traveling flange disposed about the hard tube and configured to travel axially with respect to the hard tube, wherein the traveling flange comprises at least one of a triangular geometry having convex sides forming a Reuleaux triangle, a circular geometry, a rectangular geometry, a square geometry, or an oblique geometry; and a wedge shaped body comprising a base flange and extending between a base flange face and a sealing face, wherein the hard tube is in fluid communication with the body with the radially projecting flange coupled proximate the sealing face.

9. The wedge adapter seal of claim 8, wherein the wedge shaped body comprises a multi-lobed structure.

10. The wedge adapter seal of claim 9, wherein the multi-lobed structure comprises a three-lobed structure, wherein each lobe of the three-lobed structure is defined by multi radial curves forming at least one of an epitrochoidal or epicycloidal geometry.

11. The wedge adapter seal of claim 8, wherein the wedge shaped body further comprises a first bore through the sealing face and a second bore through the base flange face in fluid communication via a transition region.

12. The wedge adapter seal of claim 11, wherein the transition region comprises at least one of a chamfer, a radial surface, a multi radial surface, or a throttling device.

13. The wedge adapter seal of claim 8, wherein the sealing face defines a first plane and the base flange face defines a second plane, wherein the first plane and the second plane intersect at an angle $\theta$ between 5° and 75°.

14. The wedge adapter seal of claim 13, wherein the angle $\theta$ is defined by a clearance envelope describing an arc segment passing through the second plane and within a region described between the first plane and the second plane.

15. The wedge adapter seal of claim 8, further comprising a first seal plate coupled between the radially projecting flange and the sealing face and a second seal plate coupled between the base flange face and the second component.

\* \* \* \* \*